United States Patent
Nakamura et al.

(10) Patent No.: US 10,977,531 B1
(45) Date of Patent: Apr. 13, 2021

(54) IMAGE PROCESSING APPARATUS, IMAGE FORMING APPARATUS, AND IMAGE PROCESSING METHOD FOR IMPROVING PERFORMANCE OF READING DATA OF RIP PROCESS

(71) Applicant: KYOCERA Document Solutions Inc., Osaka (JP)

(72) Inventors: Masayoshi Nakamura, Osaka (JP); Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/699,493

(22) Filed: Nov. 29, 2019

(51) Int. Cl.
  *G06F 15/00* (2006.01)
  *G06K 1/00* (2006.01)
  *G06K 15/00* (2006.01)
  *G06K 15/02* (2006.01)

(52) U.S. Cl.
  CPC ..... *G06K 15/1836* (2013.01); *G06K 15/1898* (2013.01)

(58) Field of Classification Search
  CPC .............. G06K 15/1836; G06K 15/1898
  USPC ............................. 358/1.1, 1.16, 1.9
  See application file for complete search history.

(56) References Cited

U.S. PATENT DOCUMENTS

| | | |
|---|---|---|
| 5,309,441 A | 5/1994 | Kuroda |
| 7,606,950 B2 | 10/2009 | Breyer |
| 9,146,835 B2 | 9/2015 | Bellows et al. |
| 2007/0171916 A1* | 7/2007 | Matsutani ........... H04L 47/2458 370/395.42 |
| 2010/0265525 A1* | 10/2010 | Hagiwara ................. G06T 9/00 358/1.9 |
| 2018/0182059 A1* | 6/2018 | Achiwa ..................... G06T 1/20 |

* cited by examiner

*Primary Examiner* — Douglas Q Tran
(74) *Attorney, Agent, or Firm* — Hawaii Patent Services; Nathaniel K. Fedde; Kenton N. Fedde

(57) ABSTRACT

Provided is an image processing apparatus that improves performance of reading data of a RIP process. A multi-channel DMA (Direct Memory Access) controller performs reading or writing of stored data related to a RIP (Raster Image Processor). A FIFO (First In, First Out) is able to change a number of entries for each of the channels of the multi-channel DMA controller. An image processing control unit interprets the RIP order, and according to that order, changes the configuration of the number of entries for each of the channels, and controls processing of the data.

17 Claims, 4 Drawing Sheets

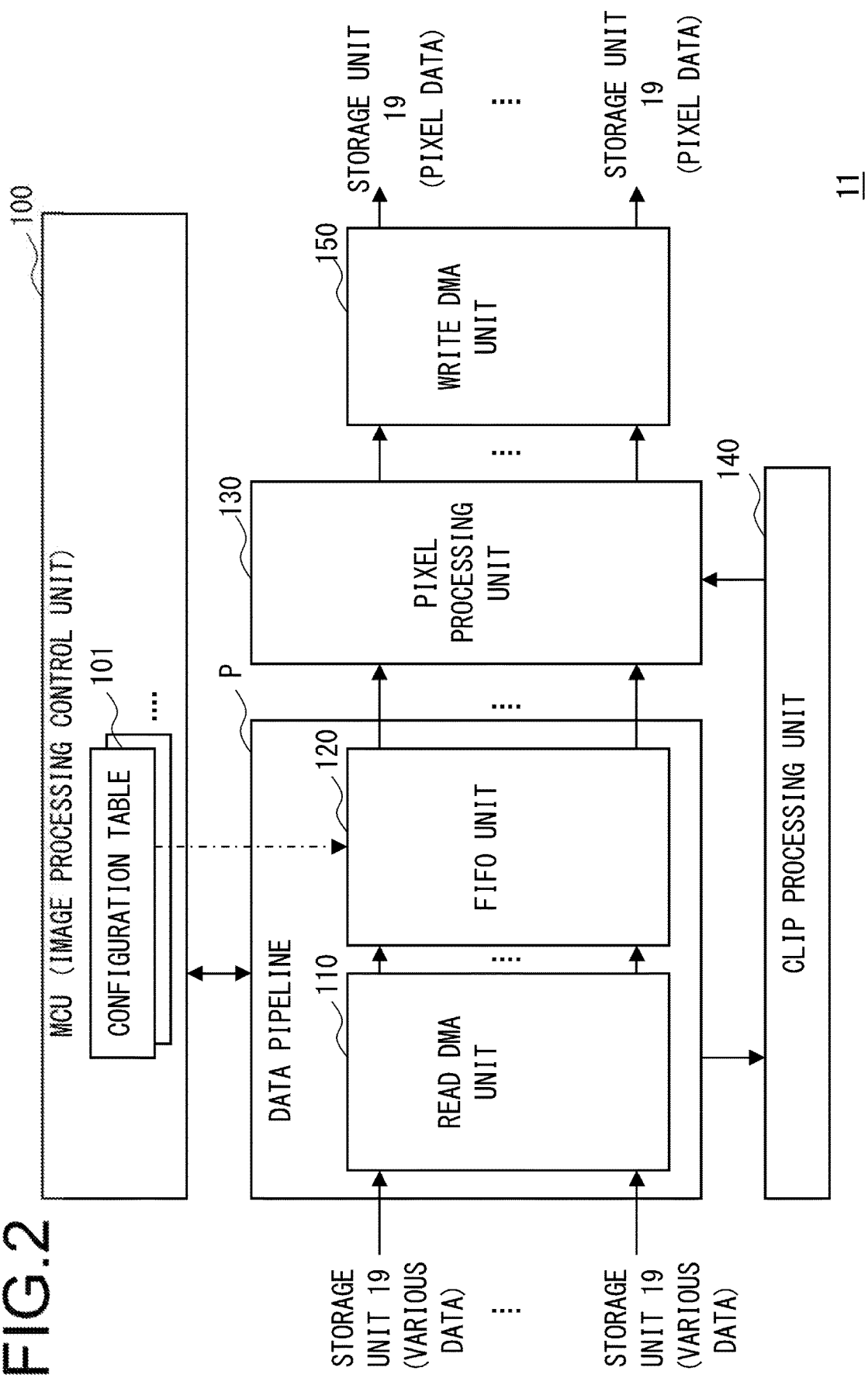

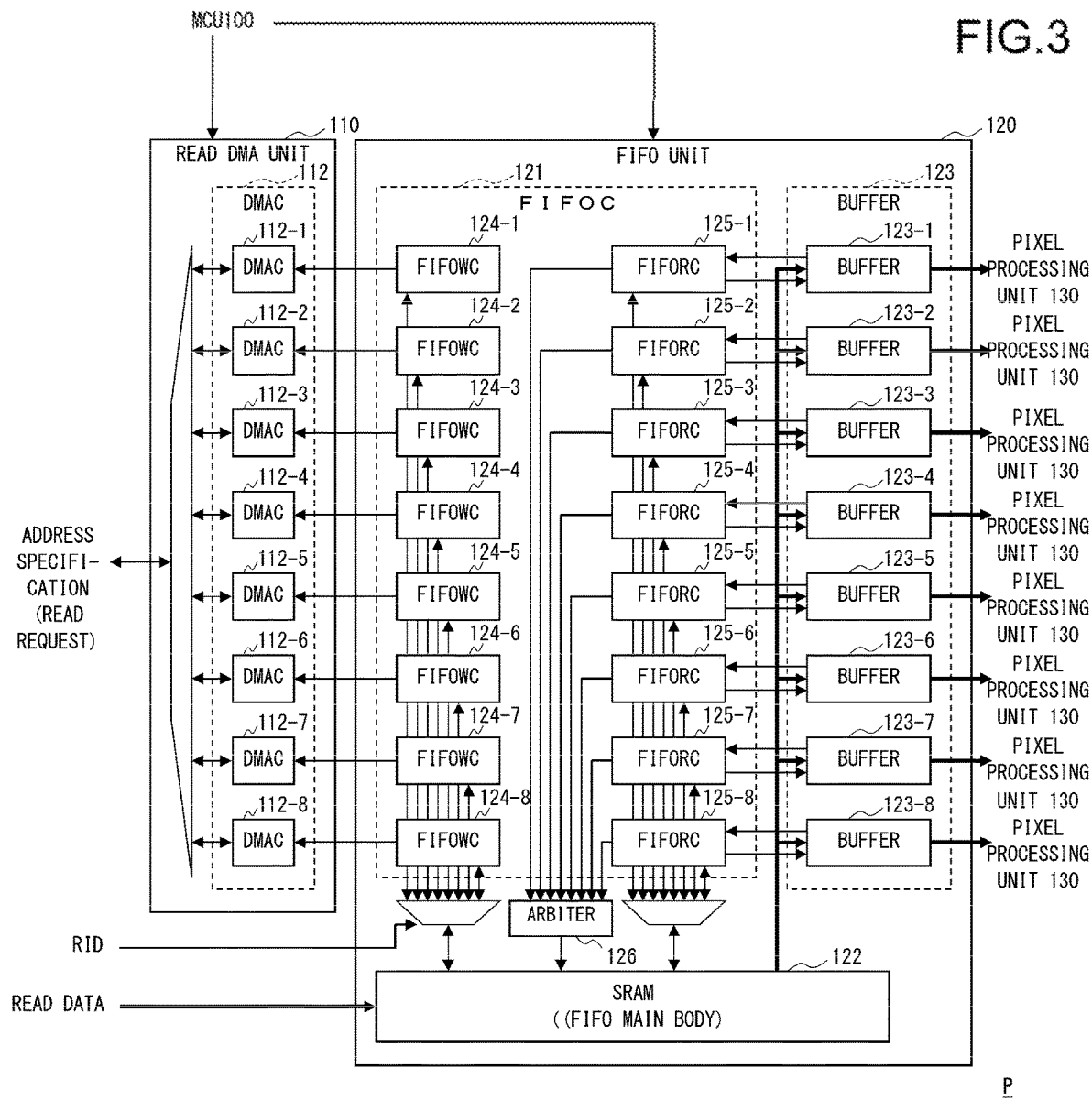

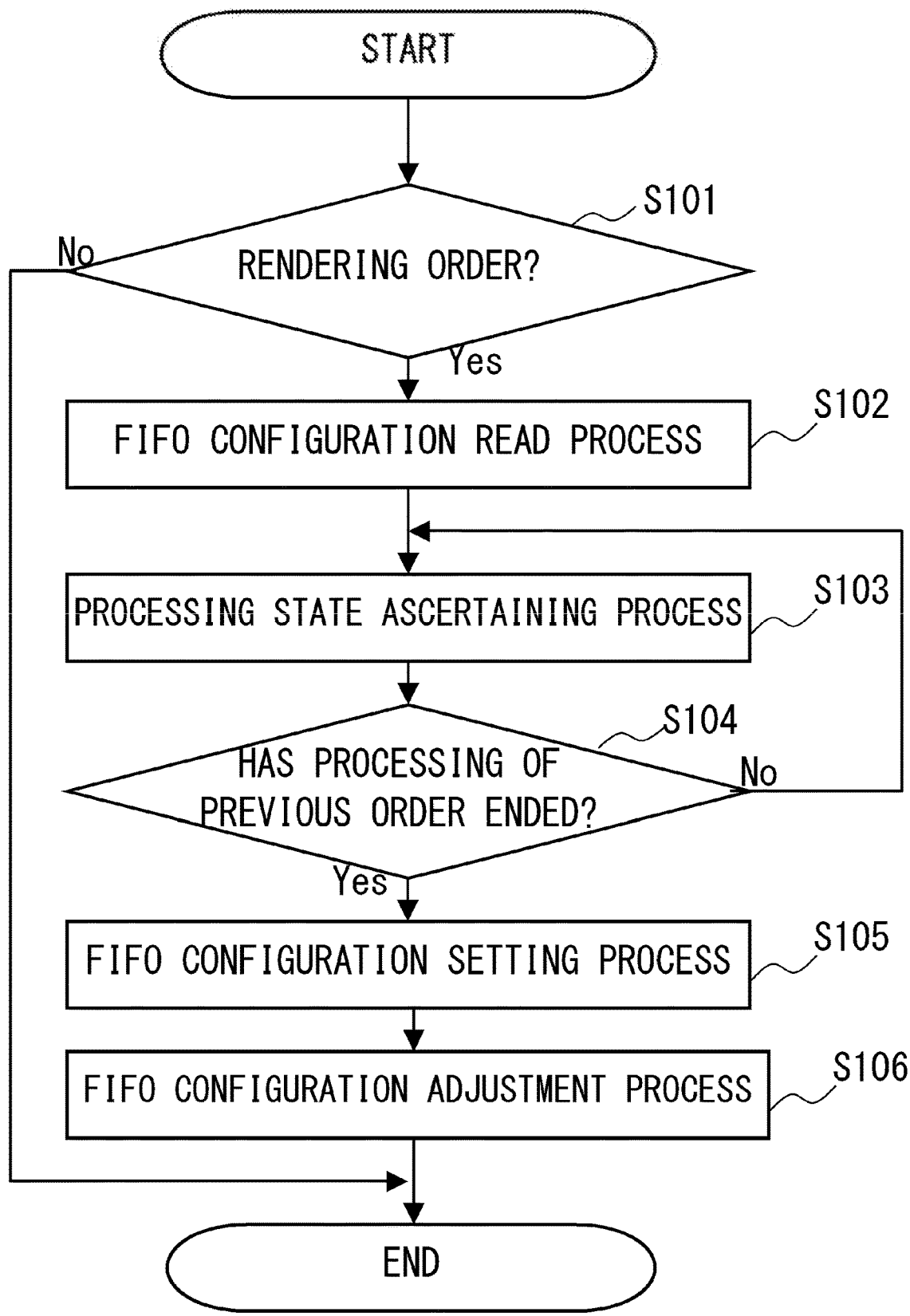

IMAGE PROCESSING APPARATUS, IMAGE FORMING APPARATUS, AND IMAGE PROCESSING METHOD FOR IMPROVING PERFORMANCE OF READING DATA OF RIP PROCESS

BACKGROUND

The present disclosure relates to an image processing apparatus, an image forming apparatus, and an image processing method.

There are image forming apparatuses such as multifunctional peripherals (MFPs) or the like capable of printing documents and images.

In such an image forming apparatus, RIP (Raster Image Processor) image processing that forms an image of page data described in a page description language such as PostScript (registered trademark) or the like is performed.

Therefore, there are image forming apparatuses provided with an ASIC (Application Specific Integrated Circuit, a processor for a specific application) for speeding up the RIP process.

In a typical technique, there is an image forming apparatus equipped with such an ASIC.

In this kind of ASIC, a RIP processing data pipeline may include a multi-channel DMA (Direct Memory Access).

SUMMARY

The image processing apparatus according to the present disclosure includes: a multi-channel DMA (Direct Memory Access) controller configured to perform reading or writing of stored data related to a RIP (Raster Image Processor); a FIFO (First In, First Out) configured to be able to change a number of entries for each of the channels of the multi-channel DMA controller; and an image processing control unit configured to interpret a RIP order and change the configuration of the number of entries for each of the channels, and control processing of the data.

The image forming apparatus according to the present disclosure includes a storage unit configured to store the data; and the image processing apparatus.

The image processing method according to the present disclosure is an image processing method executed by an image processing apparatus that includes a DMA and a FIFO, whereby the image processing apparatus, including the steps of: controlling a multi-channel DMA (Direct Memory Access) that performs reading or writing of stored data related to a RIP (Raster Image Processor); setting a FIFO (First In, First Out) that is able to change a number of entries for each of the channels of the multi-channel DMA; interpreting a RIP order, changing the configuration of the number of entries for each of the channels, and controlling processing of the data.

BRIEF DESCRIPTION OF THE DRAWINGS

FIG. 2 is a block diagram illustrating a control configuration of the image processing unit illustrated in FIG. 1.

FIG. 3 is a block diagram illustrating details of the data pipeline illustrated in FIG. 2.

FIG. 4 is a flowchart of the DMA setting configuration process of an embodiment according to the present disclosure.

DETAILED DESCRIPTION

Embodiments

Figure 1:
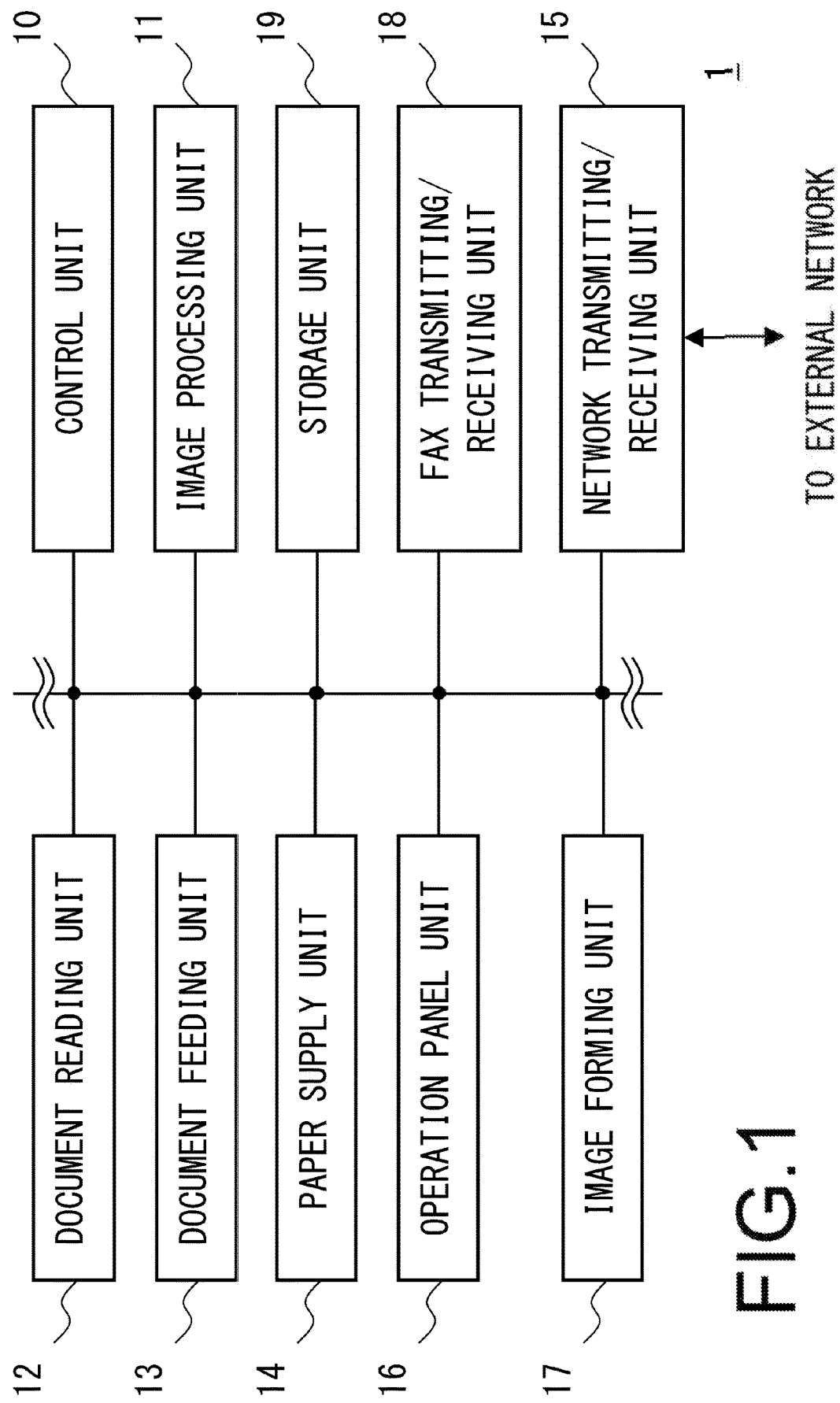
FIG. 1 is a system configuration diagram of an image forming apparatus of an embodiment according to the present disclosure.

[System Configuration of the Image Forming Apparatus 1]

First, the system configuration of the image forming apparatus 1 will be described with reference to FIG. 1.

The image forming apparatus 1 includes an image processing unit 11, a document reading unit 12, a document feeding unit 13, a paper supply unit 14, a network transmitting/receiving unit 15, an operation panel unit 16, an image forming unit 17 (image forming means), a FAX transmitting/receiving unit 18, a storage unit 19 and the like. Each unit is connected to a control unit 10 and operation is controlled by the control unit 10.

The control unit 10 is an information processing unit such as a general purpose processor (GPP), a central processing unit (CPU), a micro processing unit (MPU), a digital signal processor (DSP), a graphics processing unit (GPU) or the like.

The control unit 10 reads a control program stored in the ROM or HDD of the storage unit 19, expands the control program in the RAM, and executes the control program. In addition, the control unit 10 performs overall control of the apparatus in accordance with specified instruction information inputted from an external terminal or the operation panel unit 16.

In the present embodiment, the control unit 10 can execute (accelerate) the RIP at high speed by the ASIC of the image processing unit 11 described below.

The image processing unit 11 is a control calculation unit dedicated to image processing, and performs specified image processing on image data. The image processing unit 11 is able to perform processing such as enlargement/reduction, density adjustment, gradation adjustment, image improvement and the like as specified image processing, for example.

Moreover, the image processing unit 11 stores an image read by the document reading unit 12 in the storage unit 19 as printing data. At this time, the image processing unit 11 may also convert the printing data into an electronic document such as PDF or the like, or a file of image data such as TIFF or the like. Furthermore, the image processing unit 11 may be capable of executing at least a part of an OCR (Optical Character Recognition) process.

In the present embodiment, the image processing unit 11 includes a RIP accelerator ASIC or the like.

In the RIP of this embodiment, the image processing unit 11 is able to perform image processing for each pixel. The image processing unit 11 reads an order list generated by interpreting the page file by the control unit 10 and performs image processing in accordance with an order instruction included in the order list.

The document reading unit 12 reads a set document. In addition, the document reading unit 12 is arranged on the upper part of the main body of the image forming apparatus 1.

The document reading unit 12 includes a scanner, a platen glass, and a document reading slit. In a case of reading a document placed on the platen glass, the document reading unit 12 moves the scanner to a position facing the platen glass and reads the document placed on the platen glass while scanning to obtain image data, and outputs the acquired image data to the control unit 10.

In addition, in a case of reading a document fed from the document feeding unit 13, the document reading unit 12 moves the scanner to a position facing the document reading slit. Then, the document reading unit 12 reads the document via the document reading slit in synchronization with a document conveying operation by the document feeding unit 13, and acquires image data. The document reading unit 12 outputs the acquired image data to the control unit 10.

The document feeding unit 13 conveys a document read by the document reading unit 12. The document feeding unit 13 is arranged on the upper part of the document reading unit 12.

The document feeding unit 13 includes a document placement unit and a document conveying mechanism. The document feeding unit 13 feeds the documents placed on the document placement unit one by one by the document conveying mechanism to the document reading unit 12.

The paper supply unit 14 feeds the recording paper one by one toward the image forming unit 17. The paper supply unit 14 is provided in the main body unit.

The network transmitting/receiving unit 15 is a network connecting unit that includes a LAN board, a wireless transmitting/receiving device, or the like for connecting to an external network such as a LAN, a wireless LAN, a WAN, a mobile phone network, and the like.

The network transmitting/receiving unit 15 transmits and receives data on a data communication line and transmits and receives voice signals on a voice telephone line.

The operation panel unit 16 includes an input unit such as buttons, a touch panel, or the like, and a display unit such as an LCD (Liquid Crystal Display), an organic EL display, or the like. In addition, the operation panel unit 16 is arranged on the front side of the image forming apparatus 1.

The buttons on the input unit of the operation panel unit 16 may be a numeric keypad, a start button, a cancel button, a button for switching the operating mode, buttons for performing instructions related to the execution of a job, and the like. The operating mode may include various types of modes such as copying, FAX transmission, scanning, network scanning, and the like. Moreover, a job includes printing, transmitting, storage, recording and the like of a selected document. The input unit of the operation panel unit 16 acquires instructions from a user for various jobs of the image forming apparatus 1. Furthermore, it is also possible to input and change information of each user according to user instructions acquired from the operation panel unit 16.

The image forming unit 17, according to an output instruction from a user, causes an image to be formed on recording paper from data stored in the storage unit 19 and read by the document reading unit 12, or from data acquired from an external terminal.

The image forming unit 17 includes a photosensitive drum, an exposing unit, a developing unit, a transferring unit, a fixing unit, and the like. The image forming unit 17 records a toner image on recording paper by executing an image forming process that includes charging, exposing, developing, transferring, and fixing.

The FAX transmitting/receiving unit 18 performs facsimile transmission or reception. The FAX transmitting/receiving unit 18 is able to receive a facsimile from another FAX apparatus via a voice line, store the facsimile in the storage unit 19, and cause the image forming unit 17 to form an image. In addition, the FAX transmitting/receiving unit 18 is able to convert a document read by the document reading unit 12 or data of a network FAX transmitted from an external terminal into image data, and transmit that image data to another FAX apparatus via a voice line.

The storage unit 19 is a semiconductor memory such as a ROM (Read Only Memory), a RAM (Random Access Memory) or the like, or a non-temporary recording medium such as an HDD (Hard Disk Drive) or the like.

The RAM of the storage unit 19, even when in a power-saving state, may maintain the stored content by a function such as self-refresh or the like.

The ROM and HDD of the storage unit 19 store control programs and data for controlling the operation of the image forming apparatus 1, and store data used for the image processing unit 11, and the like. In addition, the storage unit 19 also stores other data such as user account settings, and the like. Moreover, the storage unit 19 may include a storage folder area for each user.

The storage unit 19 of this embodiment stores job and order list data as data used by the image processing unit 11.

A job is printing data that includes page data described in a page description language.

The order list is a sequence of image processing instructions called orders which is based on the page data within a job that is to be interpreted by the control unit. This order is data related to the RIP (Raster Image Processor) of this embodiment, and includes an image processing command and data for the image processing unit 11. The order list includes a plurality of orders, and the orders are processed sequentially.

In addition, in this embodiment, an example will be described in which the RAM of the storage unit 19, the control unit 10, and the image processing unit 11 are connected by a dedicated bus having a data bus width of 128 bits.

Note that in the image forming apparatus 1, the control unit 10 and the image processing unit 11 may be integrally formed, such as a CPU with a built-in GPU, a chip-on-module package, an SOC (System On a Chip), or the like.

In addition, the control unit 10 and the image processing unit 11 may include built-in RAM, ROM, flash memory, or the like.

[Configuration of the Image Processing Unit 11]

Next, the control configuration of the image processing unit 11 will be described with reference to FIG. 2 and FIG. 3.

In this embodiment, the image processing unit 11, according to an order such as rendering or the like, is able to set a channel and function to be used for each channel described later. This function includes decompression, conversion from 1-bit color to 8-bit color, and the like.

The image processing unit 11 includes an MCU 100, a data pipeline P, a pixel processing unit 130, a clip processing unit 140, and a write DMA unit 150.

The MCU 100 is an MCU (Micro Controller Unit, MCU 100) that is an image processing control unit that controls each circuit of the image processing unit 11.

The MCU 100 interprets a RIP order, executes an order included in the order list read by the dedicated DMA, and causes other circuits to perform each process corresponding to the order. This process includes control of processing of data in the data pipeline P.

The MCU 100 stores a configuration table 101 and the like which will be described later in a nonvolatile storage unit such as a built-in EEPROM, flash memory, or the like. In addition, the storage unit inside the MCU 100 stores control programs and the like including microcode, or the like for processing each order. Furthermore, the storage unit inside the MCU 100 also includes a temporary data storage area such as a RAM or the like.

The data pipeline P is a circuit that reads data from the storage unit 19 and processes the data. The data pipeline P, as a configuration of the reading unit, includes a read DMA unit 110 and a FIFO unit 120.

The read DMA unit 110 is a DMA (Direct Memory Access) that reads various data from the storage unit 19.

More specifically, the read DMA unit 110 of this embodiment is a collection of DMA controllers for a plurality of channels (hereinafter abbreviated as "DMAC"). All of the channels of the read DMA unit 110 perform DMA reading from the storage unit 19 in correspondence with a common dedicated bus.

Note that, in addition to this read DMA unit 110, a DMA dedicated to the MCU 100 for reading an order list may be provided.

The FIFO unit 120 is a FIFO (First In, First Out) corresponding to the read DMA unit 110.

In this embodiment, the FIFO unit 120 is configured to include an SRAM 122 including a multiple entry FIFO corresponding to each channel of the read DMA unit 110.

Details of the read DMA unit 110 and the FIFO unit 120 will be described later.

The clip processing unit 140 is a circuit for performing an image clipping process. In this clipping process, another image is clipped (deleted or combined) according to a set area.

The pixel processing unit 130 is a circuit that performs pixel processing. As the pixel processing, the pixel processing unit 130 can collectively perform a filtering process such as a Boolean (logic) operation process (Boolean process), blending and the like for a plurality of pixels.

The write DMA unit 150 is a DMA that writes the image data processed by the pixel processing unit 130 to the storage unit 19 as pixel data.

In this embodiment, an example will be described in which the data width of the data pipeline P is 64 bits (dword) or 128 bits (qword).

In addition, in this embodiment, an example will be described in which the read DMA unit 110 and the write DMA unit 150 read and write data from the RAM of the storage unit 19 at a high speed with a data bus width of 128 bits.

Next, a detailed example of the read DMA unit 110 and the FIFO unit 120 of the data pipeline P will be described with reference to FIG. 3.

In the present embodiment, in a dedicated bus connected to the data pipeline P, a read request that specifies an address for reading data to the storage unit 19 and read data that actually reads data from the dedicated bus operate independent of each other.

In FIG. 3, the flow of data that is actually read by this read data is indicated by a thick line, and instructions by other signals are indicated by a thin line.

More specifically, the read DMA unit 110 includes a DMAC 112.

The FIFO unit 120 includes a FIFOC 121, an SRAM 122, a buffer 123, and an arbiter 126.

The DMAC 112 is a multi-channel DMAC.

In this embodiment, an example will be described in which DMAC 112-1 to DMAC 112-8 corresponding to channel 1 to channel 8 are used as an example of the configuration. In accordance with a specific timing, each of the DMACs 112-1 to 112-8 of the plurality of channels is switched in order with the dedicated bus and specifies a read address.

The FIFOC 121 is a FIFO controller for the SRAM 122. The operation of this controller will be described in detail later.

The SRAM 122 is an SRAM (Static RAM) that includes FIFO entries for data processing.

In this embodiment, the SRAM 122 is the FIFO main body, and is capable of temporarily holding data that is read from the storage unit 19 according to a read request of the read DMA unit 110. In this embodiment, the SRAM 122 is used for absorbing the band gap of the 8-channel pixel processing unit 130 that performs parallel processing. In other words, in this embodiment, an example will be described in which one read port in the SRAM 122 is shared by 8 channels.

In this embodiment, the SRAM 122 is capable of changing the number of entries of the SRAM 122 to be assigned for each DMAC 112 channel. Then, the number of entries may also be changed by the MCU 100. In other words, it is possible to set the configuration of the number of entries depending on how much capacity of the SRAM 122 to allocate to the channels.

For example, in a case where the SRAM 122 has a capacity of 1024 entries, the MCU 100 is able to set values such as 256 entries for channel 0, 512 entries for channel 1, 128 entries for channel 2, 0 entries for channel 3, and 128 entries for channel 4 corresponding to the type of order or the like In other words, the SRAM 122 makes the number of entries variable (configurable), such as entries #0 to #127 for channel 1 and entries #128 to #255 for channel 2.

The setting of the number of entries for each channel of the SRAM 122 is stored as a configuration table 101 in a built-in storage unit of the MCU 100 as described above. Note that the entry of each channel of the SRAM 122 indicates a group of the number of bits to be allocated. In this embodiment, for example, an example is given in which 64 bits or 128 bits that can be transmitted and received at a time on a dedicated bus are configured as one entry.

These SRAM 122 inputs are data received from the dedicated bus connected to the storage unit 19 by the DMAC 112. The SRAM 122 outputs supply data to each of the 8-channel data pipelines P.

Note that in this embodiment, there may be only one or two read ports of the SRAM 122 as described above.

The buffer 123 is an output buffer. Here, the pixel processing by the pixel processing unit 130 is executed in parallel, so each channel independently requests data. For this reason, the buffer 123 is provided as a buffer for absorbing a gap between data reading from the SRAM 122 and a data request of the pixel processing unit 130. As described above, in the SRAM 122, one read port is shared by 8 channels, so there may be a difference in the bandwidth for each channel. For this reason, the buffer 123 is able to fill this bandwidth difference. As the buffer 123, it is possible to use, for example, a 2 deep buffer or the like.

In this embodiment, an example will be described in which buffer 123-1 to buffer 123-8 corresponding to channels 1 to 8 are provided as the buffer 123.

Here, the FIFOC 121 will be described in detail.

The FIFOC 121 includes FIFOWCs 124-1 to 124-8 and FIFORCs 125-1 to 125-8.

Of these, FIFOWCs 124-1 to 124-8 are write controllers corresponding to the FIFO of the SRAM 122. The FIFOWCs 124-1 to 124-8 control writing (write) from the storage unit 19 to the SRAM 122 via the DMA. More specifically, the FIFOWCs 124-1 to 124-8 acquire a write enable signal (SRAM Write Enable) for the SRAM 122. At this time, in the dedicated bus of this embodiment, when performing read data, it is possible to acquire a RID (Read ID) in order to know which DMAC the data is for. More specifically, when the read DMA unit 110 requests read data, the ID (number) assigned to each read DMA is made clear in the RAID (Read Address ID). Then, when receiving read data, an ID corresponding to the RAID is added as a RID. As a result, it becomes possible to acquire the RID when receiving data, and to identify which channel requested the data.

Then, corresponding to this RID, FIFOWCs 124-1 to 124-8 perform instructions to DMACs 112-1 to 112-8 corresponding to each channel to perform a read request. As a result, actual reading of data from the storage unit 19 is executed for each channel of the SRAM 122.

The FIFORCs 125-1 to 125-8 are a read controller corresponding to the FIFO of the SRAM 122. This read controller obtains a read enable signal (SRAM Read Enable) for the SRAM 122 and performs instructions to the buffers 123-1 to 123-8 corresponding to each channel. As a result, data is read from the entry of each channel of the SRAM 122, and data is sent to the pixel processing unit 130 via the buffer 123.

The arbiter 126 is a circuit that performs arbitration between the FIFORCs 125-1 to 125-8 and the SRAM 122 that is the FIFO main body.

To describe this more specifically, when there is an empty space in the buffers 123-1 to 123-8, the FIFORCs 125-1 to 125-8 are able to give an instruction to acquire data. When there is data in the FIFO main body, the FIFORCs 125-1 to 125-8 read the data and transfer the data to the buffers 123-1 to 123-8. In other words, in a case where there is empty space in the buffers 123-1 to 123-8 and the FIFO main body has data, the FIFORCs 125-1 to 125-8 perform read instructions to the SRAM 122 (FIFO main body). In the read protocol of the SRAM 122, "Read Enable" is set to "High". At this time, there is a possibility that a plurality of channels will simultaneously set "Read Enable" to "High", so the arbiter 126 performs arbitration for that.

Note that, in addition to the arbiter 126, a circuit for performing arbitration for each channel of the DMAC 112 may be further provided.

[DMA Setting Configuration Process by the Image Forming Apparatus 1]

Next, the DMA setting configuration process by the image forming apparatus 1 of an embodiment according to the present disclosure will be described with reference to FIG. 4.

When executing the RIP process of this embodiment, the control unit 10 interprets job page data and the like stored in the storage unit 19, generates an order list, and places the order list in the storage unit 19. Then, by the control unit 10 giving an instruction to the image processing unit 11 to perform drawing, the DMA setting configuration process of the present embodiment is executed.

In the RIP process of this embodiment, when the address of the memory space where the order list stored in the storage unit 19 is arranged is presented to the control unit 10, the image processing unit 11 reads the order list from the storage unit 19 and performs image processing that corresponds to that order list. This order list includes a plurality of orders as described above, and these orders are sequentially processed by the image processing unit 11.

In the DMA setting configuration process of this embodiment, the MCU 100 changes the configuration of the number of entries for each channel of the SRAM 122 of the read DMA unit 110 in accordance with the order, and controls the processing of data in the data pipeline P. In other words, this process indicates how the MCU 100 performs configuration of the number of entries.

When doing this, the MCU 100 determines whether the order is a rendering order or a setting order, and is able to change the configuration of the number of entries only in the case of a rendering order. Furthermore, the MCU 100 is able to change the configuration of the number of entries in accordance with the type of rendering order.

In addition, the MCU 100 is able to adjust the configuration of the number of entries by monitoring the FIFO unit 120 corresponding to a plurality of channels.

The DMA setting configuration process of this embodiment is mainly executed by each circuit of the image processing unit 11 with programs stored in the built-in memory and the MCU 100 with programs stored in the storage unit 19 and using hardware resources in cooperation with each of the units.

Hereinafter, the DMA setting configuration process of this embodiment will be described in detail step by step with reference to the flowchart in FIG. 4.

(Step S101)

First, the MCU 100 determines whether or not the order is a rendering order.

The MCU 100 interprets the order list, and determines "Yes" in a case of a rendering order in which executing image processing in the data pipeline P is necessary. The MCU 100 determines "No" in the case of other setting orders or the like.

In the case of "Yes", the MCU 100 advances the process to step S102.

In the case of "No", the MCU 100 ends the DMA setting configuration process of this embodiment.

(Step S102)

In a case of a rendering order, the MCU 100 performs a FIFO configuration read process.

The MCU 100 reads the configuration table 101 corresponding to the interpreted rendering order type, and stores the table as temporary data in a storage unit inside the MCU 100.

In other words, the MCU 100 determines which configuration table 101 to read according to the interpreted order, and reads the set value.

Note that the MCU 100 is also able to store the configuration table 101 in the RAM of the storage unit 19 or the like.

(Step S103)

Here, the MCU 100 performs a processing state ascertaining process.

The MCU 100 ascertains the processing state as to whether or not the processing of the previous order is still being executed in the data pipeline P.

(Step S104)

Next, the MCU 100 determines whether or not the processing of the previous order has ended. The MCU 100 determines "Yes" when it is ascertained that the processing of the previous order has ended. The MCU 100 determines "No" when it is ascertained that the previous order is still being executed.

In the case of "Yes", the MCU 100 advances the process to step S105.

In the case of "No", the MCU 100 returns the process to step S103, and waits until the process of a previous order ends.

(Step S105)

In a case where the processing of the previous order has ended, the MCU 100 performs a FIFO configuration setting process.

The MCU 100 applies the read configuration table 101 to the SRAM 122 of the FIFO unit 120 and changes the number of entries for each channel of the DMAC 112. In other words, it is possible to change the configuration of the number of entries in accordance with the type of order. (Step S106)

Next, the MCU 100 performs a FIFO configuration adjustment process.

The MCU 100 monitors the FIFO unit 120 and dynamically adjusts the configuration of the number of entries for each channel.

More specifically, the MCU 100 monitors the state of each channel of the SRAM 122. For example, as state information, the MCU 100 ascertains that channel No. 0 is always full of entries, or channel No. 1 is almost never full, or channel No. 2 entries are almost empty. The MCU 100 is able to ascertain this state information for each order type.

The MCU 100, in accordance with this state information, is able to change the configuration table 101 corresponding to the order. In other words, for that configuration table 101, the MCU 100 is able to perform adjustment for each channel so that the number of entries to be allocated is increased when the channel is nearly full, and conversely, is able to perform adjustment so that the number of entries to be allocated is decreased when the channel is nearly empty. In the example described above, the MCU 100 adjusts the configuration table 101 so that the entries assigned to channel No. 2 are decreased and so that those entries are assigned to channel No. 0.

This completes the DMA setting configuration processing according to the embodiment of the present disclosure.

With the configuration described above, the following effects may be obtained.

A typical ASIC may include a multi-channel DMA in the RIP processing data pipeline. However, in some cases when the number of FIFO entries for each channel is not properly configured, performance is degraded. On the other hand, in an ASIC FIFO for video image processing, optimum processing like in RIP processing cannot be performed.

On the other hand, the image processing unit 11 according of an embodiment according to the present disclosure includes: a multi-channel DMAC 112 that reads or writes stored data associated with a RIP; a FIFO (First In, First Out) of a SRAM 122 of a FIFO unit 120 that is able to change the number of entries for each channel of multi-channel DMAC 112; and an MCU 100 that interprets a RIP order, and in accordance with that order, changes the configuration of the number of entries for each channel, and performs control of data processing.

In doing so, it is possible to improve performance related to the DMAC 112 of the data pipeline P in an ASIC for RIP processing, or the like. As a result, image formation of page data can be accelerated and energy saving by reducing standby power and the like when waiting for processing may also be expected. Thus, the maintenance cost of the image forming apparatus 1 may be reduced.

Moreover, in the image processing unit 11 of an embodiment according to the present disclosure, the MCU 100 changes the configuration of the number of entries in accordance with the order type.

With this kind of configuration, the number of entries for each channel of the FIFO unit 120 can be changed for each order in the order list of the RIP process. In other words, the number of FIFO entries in the SRAM 122 can be optimized according to the order, and thus the DMA performance can be improved. Furthermore, by changing the number of entries according to the type of order, and by reducing the number of unused channel entries, the power consumption of the ASIC can be reduced.

In the image processing unit 11 of an embodiment according to the present disclosure, the MCU 100 monitors the FIFO corresponding to a plurality of channels of the SRAM 122 and adjusts the configuration of the number of entries.

With this kind of configuration, the number of entries in each channel of the FIFO of the SRAM 122 can be optimized in accordance with actual processing of an order. As a result, optimization of the performance can be performed according to the processing tendency of page data, and the like.

The image forming apparatus 1 of an embodiment according to the present disclosure includes a storage unit 19 that stores data and an image processing unit 11.

With this kind of configuration, it is possible to provide an image forming apparatus 1 having improved RIP processing performance.

Other Embodiments

Note that in the above-described embodiments of the present disclosure, for the ease of explanation, an example is described in which the DMAC 112 includes eight channels. However, for example, the image processing unit 11 may be configured to have even a larger number of channels such as 9 to 32 channels or the like.

In addition, in the embodiment described above, the DMAC 112 unit acquires data directly from the storage unit 19. However, the DMAC 112 unit may be configured so as to specify only the address of the order list acquired by DMA from the storage unit 19, and the order list data itself may be acquired by the FIFO unit 120 via the arbiter 126. In other words, specifying the address and acquiring data may be shared between the DMAC 112 unit and the FIFO unit 120.

With this kind of configuration, the performance can be maximized by optimizing the configuration of the ASIC or the like.

In the embodiment described above, for the ease of explanation, it is described that there is a configuration table 101 for each order type.

However, configuration may be such that the same configuration table 101 is used for similar items corresponding to several types of processing such as pixel processing, clip processing and the like as order types.

Alternatively, configuration may be such that in a case of a large frame, and when the operands included in the order are compressed or the like, a configuration table 101 corresponding to elements other than orders may be provided.

In addition, in the embodiment described above, the number of entries for each channel of the FIFO of the SRAM 122 is changed only in the case of a rendering order.

However, the number of entries in each channel of the FIFO of the SRAM 122 may also be changed in the case of a setting order that is an order for performing various settings.

Furthermore, in the embodiment described above, that the configuration table 101 is temporarily read and applied after the processing of the previous order has ended.

However, after the processing of the previous order has ended, the configuration table 101 may be read and applied directly to the change in the number of entries of the FIFO of the SRAM 122.

By doing so, the performance can be improved in accordance with a flexible configuration.

In the embodiment described above, the FIFO configuration adjustment process is performed every time.

However, the MCU 100 may perform only monitoring for ascertaining the state information of each channel of the FIFO of the SRAM 122 and change the configuration table 101 at a specific timing. This specific timing may be in units of several milliseconds to several seconds, a data amount unit, an order list unit, a page unit, a job unit, or the like.

Alternatively, the result of monitoring by the MCU 100 may be ascertained by the image forming apparatus 1, and the configuration table 101 may be changed when the program and settings stored in the built-in storage unit executed by the MCU 100 are changed.

With this kind of configuration, it is not always necessary to change the configuration table 101, so performance can be further improved. Furthermore, the result of monitoring can be ascertained by the designer, maintenance manager, or the like, of the image forming apparatus 1, and the configuration table 101 can be changed and fed back to other customers when the firmware or the like for the MCU 100 is updated. In this way, by providing an optimum configuration table 101 of the FIFO of the SRAM 122, performance can be improved.

A part or any combination of the configurations described above may be configured by programmable logic other than ASIC, FPGA (Field-Programmable Gate Array), or the like. In addition, it is also possible to configure the MCU 100 as a circuit. Furthermore, each of the units described above may be configured by executing a program by a GPP (General Purpose Processor).

The technique according to the present disclosure may also be applied to an information processing apparatus other than an image forming apparatus. For example, the present disclosure can also be used for a network scanner that needs index color conversion, a server to which a scanner is separately connected via a USB, a PC (Personal Computer), a portable terminal, and the like. Furthermore, it can also be used for an ASIC of color electronic paper, a projector equipped with a color wheel, and the like.

Moreover, the configuration and operation of the embodiments described above are only examples, and needless to say, the embodiments may be appropriately modified and executed without departing from the spirit of the present disclosure.

What is claimed is:

1. An image processing apparatus, comprising:
    a multi-channel DMA (Direct Memory Access) controller configured to perform reading or writing of stored data related to a RIP (Raster Image Processor);
    a FIFO (First In, First Out) configured to be able to change a number of entries for each of the channels of the multi-channel DMA controller; and
    an image processing control unit configured to interpret a RIP order and change the configuration of the number of entries allotted for each of the channels such that the number of entries allotted to a respective channel is increased when the image processing control unit determines that the respective channel has a number of entries that is above a threshold and the number of entries allotted to the respective channel is decreased when the image processing control unit determines that the respective channel has a number of entries that is below a threshold, and control processing of the data.

2. The image processing apparatus according to claim 1, wherein
    the image processing control unit is configured to change the configuration of the number of entries according to the type of the order.

3. The image processing apparatus according to claim 1, wherein
    the image processing control unit is configured to monitor the FIFO corresponding to the plurality of channels; and
    adjust the configuration of the number of entries.

4. An image forming apparatus, comprising:
    a storage unit configured to store the data; and
    the image processing apparatus according to claim 1.

5. The image processing apparatus according to claim 1, wherein the image processing control unit is configured to monitor for an event and perform said change of the configuration at a specified timing corresponding to the occurrence of the event, wherein the event is selected from a duration of time, a data amount, an order list, a page, and a job.

6. The image processing apparatus according to claim 1, wherein the image processing control unit is configured to perform said change of the configuration when a program and settings stored in a built-in storage unit of the image processing apparatus are changed.

7. The image processing apparatus according to claim 1, wherein the change of the configuration is made by changing a configuration table, wherein the same configuration table is used for multiple order types.

8. The image processing apparatus according to claim 1, wherein the DMA is configured to specify an address of the RIP order and the FIFO is configured to obtain the RIP order from the address.

9. An image processing method executed by an image processing apparatus comprising a DMA and a FIFO, whereby the image processing apparatus, comprising the steps of:
    controlling a multi-channel DMA (Direct Memory Access) that performs reading or writing of stored data related to a RIP (Raster Image Processor);
    setting a FIFO (First In, First Out) that is able to change a number of entries for each of the channels of the multi-channel DMA; and
    interpreting a RIP order, changing the configuration of the number of entries allotted for each of the channels such that the number of entries allotted to a respective channel is increased when the image processing apparatus determines that the respective channel has a number of entries that is above a threshold and the number of entries allotted to the respective channel is decreased when the image processing apparatus determines that the respective channel has a number of entries that is below a threshold, and controlling processing of the data.

10. The image processing method according to claim 9, further comprising the step of:
    changing the configuration of the number of entries according to the type of the order.

11. The image processing method according to claim 9, further comprising the steps of:
    monitoring the FIFO corresponding to the plurality of channels; and
    adjusting the configuration of the number of entries.

12. The image processing method according to claim 9, further comprising monitoring for an event, wherein the change of the configuration is performed at a specified timing corresponding to the occurrence of the event, wherein the event is selected from a duration of time, a data amount, an order list, a page, and a job.

13. The image processing method according to claim 9, wherein the change of the configuration is performed when a program and settings stored in a built-in storage unit of the image processing apparatus are changed.

14. The image processing method according to claim 9, wherein the change of the configuration is made by changing a configuration table, wherein the same configuration table is used for multiple order types.

15. The image processing method according to claim 14, wherein the multiple order types include pixel processing and clip processing.

16. The image processing method according to claim 9, wherein the DMA specifies an address of the RIP order and the FIFO obtains the RIP order from the address.

17. The image processing apparatus according to claim 7, wherein the multiple order types include pixel processing and clip processing.

* * * * *